United States Patent
Li et al.

(10) Patent No.: US 9,487,688 B2
(45) Date of Patent: Nov. 8, 2016

(54) SEALANT COMPOSITION AND LIQUID CRYSTAL DISPLAY PANEL USING THE SAME

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Hongpeng Li, Beijing (CN); Sunghun Song, Beijing (CN); Jian Li, Beijing (CN); Ang Xiao, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 84 days.

(21) Appl. No.: 14/498,308

(22) Filed: Sep. 26, 2014

(65) Prior Publication Data
US 2015/0232726 A1    Aug. 20, 2015

(30) Foreign Application Priority Data

Feb. 19, 2014   (CN) .......................... 2014 1 0056329

(51) Int. Cl.
C09K 19/00     (2006.01)
C09K 3/10      (2006.01)
G02F 1/1339    (2006.01)

(52) U.S. Cl.
CPC ........... *C09K 3/1006* (2013.01); *G02F 1/1339* (2013.01); *C09K 2003/1059* (2013.01); *Y10T 428/1059* (2015.01); *Y10T 428/1068* (2015.01); *Y10T 428/1073* (2015.01); *Y10T 428/1082* (2015.01)

(58) Field of Classification Search
CPC .................... C09K 3/1006; C09K 2003/1059; C09K 2003/1037; C09K 2003/1062; G02F 1/1339; G02F 1/1341; C08G 59/22; C08G 59/56; C09J 163/00; C09J 163/10; C09J 7/0203; Y10T 428/1059; Y10T 428/1073; Y10T 428/1078; Y10T 428/1082

USPC .......... 428/1.5, 1.53, 1.54, 1.55; 252/183.11; 549/334, 335; 522/60; 425/415; 349/153

See application file for complete search history.

(56) References Cited

U.S. PATENT DOCUMENTS

| | | | | | |
|---|---|---|---|---|---|
| 4,574,132 | A | * | 3/1986 | Sayles .......................... | 523/466 |
| 5,150,239 | A | * | 9/1992 | Watanabe et al. ............ | 349/153 |
| 2011/0212328 | A1 | * | 9/2011 | Tanaka et al. ................ | 428/352 |
| 2013/0280526 | A1 | * | 10/2013 | Voci et al. .................... | 428/349 |

FOREIGN PATENT DOCUMENTS

| | | |
|---|---|---|
| CN | 1160864 A | 10/1997 |
| CN | 102153563 A | 8/2011 |
| CN | 102153730 A | 8/2011 |
| CN | 102161745 A | 8/2011 |
| CN | 103064208 A | 4/2013 |
| CN | 103554842 A | 2/2014 |
| TW | 200804448 A | 1/2008 |

OTHER PUBLICATIONS

Office Action issued Dec. 8, 2014 in corresponding in Chinese Patent Application No. 201410056329.X along with an English translation.
Office Action issued Feb. 2, 2015 in corresponding in Chinese Patent Application No. 201410056329.X along with an English translation.
Lv et al., "Research on Low Shrinkage and Weathering Resistance UV-curable Material", Journal of Wuhan University of Technology, vol. 35, No. 2, Feb. 2013.
Ou et al., "Recent Advances in Modified Epoxy Resin", China Adhesives, vol. 10, No. 2.

* cited by examiner

*Primary Examiner* — Ruiyun Zhang
(74) *Attorney, Agent, or Firm* — Nath, Goldberg & Meyer; Joshua B. Goldberg

(57) ABSTRACT

The invention relates to a sealant composition, and a liquid crystal display panel using the same. The sealant composition comprises an expansive monomer which can compensate for the volume shrinkage occurring during polymerization of traditional sealant compositions. The sealant composition of the invention can improve the alignment accuracy, enhance the bonding strength, and reduce the vernier key level of the panel, so that the problems such as lower alignment accuracy and bonding strength caused by the volume shrinkage during polymerization of the traditional sealant compositions can be solved.

14 Claims, No Drawings

SEALANT COMPOSITION AND LIQUID CRYSTAL DISPLAY PANEL USING THE SAME

FIELD OF THE INVENTION

The present invention relates to the technical field of materials, particularly to a sealant composition and a liquid crystal display (LCD) panel using the same.

BACKGROUND OF THE INVENTION

Recently, thin film transistor liquid crystal displays (TFT-LCDs) have been developed rapidly and used widely in various fields due to their advantages such as high quality of display, low power consumption, no radiation, etc. A One Drop Filling (ODF) method is usually adopted during the preparation of TFT-LCDs. In such a method, the cell process includes applying a sealant onto an array substrate or a color filter substrate, and then bonding the array substrate and the color filter substrate together in vacuum by high-accuracy alignment instruments, wherein glass fibers or silica beads are added into the sealant so as to make a cell gap. Thus, the sealant which bonds the two substrates and encloses the liquid crystal is vital for the cell process of the LCD preparation.

Conventional sealants are typically crosslinked by stepwise polymerization comprising an ultraviolet (UV) polymerization followed by a heat polymerization. During the UV polymerization, free radicals are produced from a photoinitiator in the sealant by UV irradiation, and then they initiate the polymerization of UV polymerizable monomers having carbon-carbon double bond to form a high molecular polymer. The polymerization rate of the UV polymerizable monomers having carbon-carbon double bond is relatively fast, and the volume shrinkage of the sealant during the polymerization is relatively large too. These factors can lead to problems such as a worse accuracy of alignment, and even an internal stress within the sealant which may influence the bonding strength.

SUMMARY OF THE INVENTION

An object of the present invention is to provide a sealant composition which can obviate volume shrinkage during its polymerization, so as to solve the problems such as lower alignment accuracy and bonding strength caused by the volume shrinkage occurring during the polymerization of traditional sealant compositions.

This object is achieved by providing a sealant composition comprising an expansive monomer which can expand in volume during the UV polymerization of the sealant composition.

Preferably, the expansive monomer is a spiro-orthocarbonate expansive monomer, bicyclic orthoester expansive monomer, spiro-orthoester expansive monomer, or bicyclic lactone expansive monomer. More preferably, the expansive monomer is any one of 3,9-dihydroxymethyl-3',9'-diethyl-1,5,7,11-tetraoxaspiro[5,5]undecane, 1,4,6-trioxaspiro[4,4]nonane, 3,9-di(2-norbornenyl)-1,5,7,11-tetraoxaspiro[5,5]undecane, or 3,9-di(2-anthryl)-1,5,7,11-tetraoxaspiro[5,5]undecane.

Preferably, the sealant composition further comprises:
a UV polymerizable monomer having carbon-carbon double bond; and
a heat polymerizable monomer.

Preferably, the sealant composition further comprises at least one of the following components:
a photoinitiator;
a heat curing agent; and
a particle additive.

Preferably, the UV polymerizable monomer having carbon-carbon double bond is a hydrocarbyl ester of (meth)acrylic acid, wherein the hydrocarbyl comprises 8-20 carbon atoms and may be a saturated or unsaturated linear, branched or cyclic hydrocarbyl group; and the hydrocarbyl may be optionally substituted by a hydroxy group or a carboxyl group, or may be optionally interrupted by a carbonyl group. The hydrocarbyl ester of (meth)acrylic acid may be any selected from methyl acrylate, methyl methacrylate, ethyl acrylate, propyl acrylate, and butyl acrylate.

Preferably, the heat polymerizable monomer is an epoxy-based heat polymerizable monomer.

More preferably, the epoxy-based heat polymerizable monomer is glycol diglycidyl ether.

Preferably, the photoinitiator is a peroxide initiator. The peroxide initiator may be any selected from dibenzoyl peroxide, lauroyl peroxide, 2,2'-azobisisobutyronitrile, 2,2'-azobisisoheptonitrile, diisopropyl peroxydicarbonate, and dicyclohexyl peroxydicarbonate.

Preferably, the heat curing agent is an amino curing agent.

More preferably, the amino curing agent is 1,8-diamino-3,6-dioxaoctane.

Preferably, the particle additive has a particle size in the range of 0.5 to 2 μm.

Preferably, the particle additive is $SiO_2$ particle.

Preferably, the sealant composition comprises, based on the total mass of the sealant composition:
5-25% of an expansive monomer;
20-30% of a UV polymerizable monomer having carbon-carbon double bond;
15-20% of a heat polymerizable monomer;
0.1-5% of a photoinitiator;
10-20% of a heat curing agent; and
0-20% of a particle additive.

Another object of the present invention is to provide an LCD panel sealed by the aforesaid sealant composition.

Due to the expansive monomer contained in the sealant composition of the present invention, the volume shrinkage during polymerization of the composition can be compensated, thereby the alignment accuracy can be improved, the bonding strength can be enhanced, and the vernier key level can be reduced.

DETAILED DESCRIPTION OF CERTAIN EMBODIMENTS

Embodiments of the present invention will be described in detail, so that a person skilled in the art can get a better understanding of the technical solutions of the invention.

The present invention provides a sealant composition comprising an expansive monomer which can expand in volume during the UV polymerization of the sealant composition.

The expansive monomer may be a spiro-orthocarbonate expansive monomer, bicyclic orthoester expansive monomer, spiro-orthoester expansive monomer or bicyclic lactone expansive monomer. Preferably, the expansive monomer is any one of 3,9-dihydroxymethyl-3',9'-diethyl-1,5,7,11-tetraoxaspiro[5,5]undecane, 1,4,6-trioxaspiro[4,4]nonane, 3,9-di(2-norbornenyl)-1,5,7,11-tetraoxaspiro[5,5]undecane, or 3,9-di(2-anthryl)-1,5,7,11-tetraoxaspiro[5.5]undecane.

Preferably, the sealant composition further comprises:
a UV polymerizable monomer having carbon-carbon double bond; and
a heat polymerizable monomer.

Preferably, the sealant composition further comprises at least one of the following components:
a photoinitiator;
a heat curing agent; and
a particle additive.

Preferably, the UV polymerizable monomer having carbon-carbon double bond is a hydrocarbyl ester of (meth)acrylic acid, wherein the hydrocarbyl comprises 8-20 carbon atoms and may be a saturated or unsaturated linear, branched or cyclic hydrocarbyl group; and the hydrocarbyl may be optionally substituted by a hydroxy group or a carboxyl group, or may be optionally interrupted by a carbonyl group. The hydrocarbyl ester of (meth)acrylic acid may be any selected from methyl acrylate, methyl methacrylate, ethyl acrylate, propyl acrylate, and butyl acrylate.

Preferably, the heat polymerizable monomer is an epoxy-based heat polymerizable monomer.

More preferably, the epoxy-based heat polymerizable monomer is glycol diglycidyl ether.

Preferably, the photoinitiator is a peroxide initiator. The peroxide initiator may be any selected from dibenzoyl peroxide, lauroyl peroxide, 2,2'-azobisisobutyronitrile, 2,2'-azobisisoheptonitrile, diisopropyl peroxydicarbonate, and dicyclohexyl peroxydicarbonate.

Preferably, the heat curing agent is an amino curing agent.

More preferably, the amino curing agent is 1,8-diamino-3,6-dioxaoctane.

Preferably, the particle additive is $SiO_2$ particle having a particle size in the range of 0.5-2 μm.

Preferably, the sealant composition comprises 5-25% of an expansive monomer, based on the total mass of the sealant composition.

Preferably, the sealant composition comprises, based on the total mass of the sealant composition:
5-25% of an expansive monomer;
20-30% of a UV polymerizable monomer having carbon-carbon double bond;
15-20% of a heat polymerizable monomer;
0.1-5% of a photoinitiator;
10-20% of a heat curing agent; and 0-20% of a particle additive.

The method of applying the aforesaid sealant composition comprises the following steps:
1) mixing the aforesaid components of the sealant composition in proportion, and deaerating the resultant mixture under dark condition for 1-5 hours;
2) coating the mixture obtained by step 1) onto a color filter (CF) substrate and/or an array substrate (TFT substrate), and then filling liquid crystal between the CF substrate and the TFT substrate followed by alignment and assembly, thereby forming an LCD panel;
3) irradiating the LCD panel obtained by step 2) with UV light under the following conditions: UV wavelength: 350-380 nm; duration of UV irradiation: 1-60 minutes; intensity of UV irradiation: 0.1-100 mW/cm², thereby producing a polymer by polymerization of the UV polymerizable monomer having carbon-carbon double bond upon exposure to the UV irradiation; and
4) heating the LCD panel obtained by step 3) to induce heat polymerization of the heat polymerizable monomer and the expansive monomer in the composition, wherein the reaction temperature of the heat polymerization is in the range of 100-120° C., and the reaction time is in the range of 0.5-5 hours.

The present invention further provides an LCD panel sealed by the sealant composition according to the present invention.

Some examples and comparative examples are described in detail hereafter. All the raw materials used in the examples were obtained from TCI Chemicals, unless otherwise noted.

Example 1

This example provides a sealant composition that comprises, based on the total mass of the composition:
30% of ethyl acrylate as a UV polymerizable monomer having carbon-carbon double bond, 20% of glycol diglycidyl ether as a heat polymerizable monomer, 14% of 3,9-dihydroxymethyl-3',9'-diethyl-1,5,7,11-tetraoxaspiro[5,5]undecane as an expansive monomer, 2% of dibenzoyl peroxide as a photoinitiator, 18% of 1,8-diamino-3,6-dioxaoctane as a heat curing agent, and 16% of $SiO_2$ particles having a particle size in the range of 0.5-2 μm as a particle additive.

The method of applying the aforesaid sealant composition comprises the following steps:
a) weighing the aforesaid components of the sealant composition in proportion as described above and mixing the same to form a homogeneous mixture, followed by deaerating in a deaerator under dark condition for 1 hour;
b) coating the mixture obtained by step a) onto a CF substrate (commercially available from DNP Crop.; the same was applied in the following examples), and then filling liquid crystal between the CF substrate and a TFT substrate (commercially available from BOE Crop.; the same was applied in the following examples) followed by alignment and assembly, thereby forming an LCD panel;
c) irradiating the LCD panel obtained by step b) with UV light of 350 nm wavelength for 1 minute under an irradiation intensity of 100 mW/cm²; and
d) heating the LCD panel obtained by step c) to induce heat polymerization of the heat polymerizable monomer and the expansive monomer in the composition, wherein the reaction temperature of the heat polymerization is 100° C., and the reaction time is 1 hour.

The difference between the scales of the vernier key on the TFT substrate and the CF substrate, i.e., the amount of displacement between these substrates caused by polymerization of the sealant composition, was observed by a microscope and reported as the vernier key level of the resultant LCD panel in Table 1 below (the same procedure was applied in the following examples).

Example 2

This example provides a sealant composition that comprises, based on the total mass of the composition:
30% of methyl acrylate as a UV polymerizable monomer having carbon-carbon double bond, 20% of glycol diglycidyl ether as a heat polymerizable monomer, 5% of 1,4,6-trioxaspiro[4,4]nonane and 18% of 3,9-di(2-norbornenyl)-1,5,7,11-tetraoxaspiro[5,5]undecane as an expansive monomer, 2% of lauroyl peroxide as a photoinitiator, 12% of 1,8-diamino-3,6-dioxaoctane as a heat curing agent, and 13% of $SiO_2$ particles having a particle size in the range of 0.5-2 μm as a particle additive.

The method of applying the aforesaid sealant composition comprises the following steps:

a) weighing the aforesaid components of the sealant composition in proportion as described above and mixing the same to form a homogeneous mixture, followed by deaerating in a deaerator under dark condition for 1.5 hours;

b) coating the mixture obtained by step a) onto a CF substrate, and then filling liquid crystal between the CF substrate and a TFT substrate followed by alignment and assembly, thereby forming an LCD panel;

c) irradiating the LCD panel obtained by step b) with UV light of 370 nm wavelength for 5 minutes under an irradiation intensity of 95 mW/cm$^2$; and d) heating the LCD panel obtained by step c) to induce heat polymerization of the heat polymerizable monomer and the expansive monomer in the composition, wherein the reaction temperature of the heat polymerization is 120° C., and the reaction time is 4.5 hours.

The vernier key level of the resultant LCD panel was observed and reported in Table 1 below.

Example 3

This example provides a sealant composition that comprises, based on the total mass of the composition:

25% of methyl methacrylate as UV polymerizable monomer having carbon-carbon double bond, 20% of glycol diglycidyl ether as a heat polymerizable monomer, 23% of 3,9-di(2-anthryl)-1,5,7,11-tetraoxaspiro[5,5]undecane as an expansive monomer, 2% of 2,2'-azobisisobutyronitrile as a photoinitiator, 15% of 1,8-diamino-3,6-dioxaoctane as a heat curing agent, and 15% of SiO$_4$ particles having a particle size in the range of 0.5-2 μm as a particle additive.

The method of applying the aforesaid sealant composition comprises the following steps.

a) weighing the aforesaid components of the sealant composition in proportion as described above and mixing the same to form a homogeneous mixture, followed by deaerating in a deaerator under dark condition for 2 hours;

b) coating the mixture obtained by step a) onto a CF substrate, and then filling liquid crystal between the CF substrate and a TFT substrate followed by alignment and assembly, thereby forming an LCD panel;

c) irradiating the LCD panel obtained by step b) with UV light of 375 nm wavelength for 10 minutes under an irradiation intensity of 80 mW/cm$^2$; and d) heating the LCD panel obtained by step c) to induce heat polymerization of the heat polymerizable monomer and the expansive monomer in the composition, wherein the reaction temperature of the heat polymerization is 110° C., and the reaction time is 3 hours.

The vernier key level of the resultant LCD panel was observed and reported in Table 1 below.

Example 4

This example provides a sealant composition that comprises, based on the total mass of the composition:

25% of propyl acrylate as a UV polymerizable monomer having carbon-carbon double bond, 20% of glycol diglycidyl ether as a heat polymerizable monomer, 20% of 1,4,6-trioxaspiro[4,4]nonane as an expansive monomer, 1.5% of 2,2'-azobisisoheptonitrile as a photoinitiator, 20% of 1,8-diamino-3,6-dioxaoctane as a heat curing agent, and 13.5% of SiO$_2$ particles having a particle size in the range of 0.5-2 μm as a particle additive.

The method of applying the aforesaid sealant composition comprises the following steps:

a) weighing the aforesaid components of the sealant composition in proportion as described above and mixing the same to form a homogeneous mixture, followed by deaerating in a deaerator under dark condition for 3 hours;

b) coating the mixture obtained by step a) onto a CF substrate, and then filling liquid crystal between the CF substrate and a TFT substrate followed by alignment and assembly, thereby forming an LCD panel;

c) irradiating the LCD panel obtained by step b) with UV light of 365 nm wavelength for 40 minutes under an irradiation intensity of 35 mW/cm$^2$; and d) heating the LCD panel obtained by step c) to induce heat polymerization of the heat polymerizable monomer and the expansive monomer in the composition, wherein the reaction temperature of the heat polymerization is 105° C., and the reaction time is 2.7 hours.

The vernier key level of the resultant LCD panel vas observed and reported in Table 1 below.

Example 5

This example provides a sealant composition that comprises, based on the total mass of the composition:

25% of propyl acrylate as a UV polymerizable monomer having carbon-carbon double bond, 17.5% of glycol diglycidyl ether as a heat polymerizable monomer, 20% of 3,9-dihydroxymethyl-3',9'-diethyl-1,5,7,11-tetraoxaspiro[5,5]undecane as an expansive monomer, 2% of diisopropyl peroxydicarbonate as a photoinitiator, 20% of 1,8-diamino-3,6-dioxaoctane as a heat curing agent and 15.5% of SiO$_2$ particles having a particle size in the range of 0.5-2 μm as a particle additive.

The method of applying the aforesaid sealant composition comprises the following steps:

a) weighing the aforesaid components of the sealant composition in proportion as described above and mixing the same to form a homogeneous mixture, followed by deaerating in a deaerator under dark condition for 3.5 hours;

b) coating the mixture obtained by step a) onto a CF substrate, and then filling liquid crystal between the CF substrate and a TFT substrate followed by alignment and assembly, thereby forming an LCD panel;

c) irradiating the LCD panel obtained by step b) with UV light of 360 nm wavelength for 50 minutes under an irradiation intensity of 15 mW/cm$^2$; and d) heating the LCD panel obtained by step c) to induce heat polymerization of the heat polymerizable monomer and the expansive monomer in the composition, wherein the reaction temperature of the heat polymerization is 115° C., and the reaction time is 2.5 hours.

The vernier key level of the resultant LCD panel was observed and reported in Table 1 below.

Example 6

This example provides a sealant composition that comprises, based on the total mass of the composition:

27% of ethyl acrylate as a UV polymerizable monomer having carbon-carbon double bond, 19% of glycol diglycidyl ether as a heat polymerizable monomer, 17% of 1,4,6-trioxaspiro[4,4]nonane as an expansive monomer, 3% of dicyclohexyl peroxydicarbonate as a photoinitiator, 18% of 1,8-diamino-3,6-dioxaoctane as a heat curing agent, and 16% of SiO$_2$ particles having a particle size in the range of 0.5-2 μm as a particle additive.

The method of applying the aforesaid sealant composition comprises the following steps:

a) weighing the aforesaid components of the sealant composition in proportion as described above and mixing the same to form a homogeneous mixture, followed by deaerating in a deaerator under dark condition for 4 hours;

b) coating the mixture obtained by step a) onto a CF substrate, and then filing liquid crystal between the CF substrate and a TFT substrate followed by alignment and assembly, thereby forming an LCD panel;

c) irradiating the LCD panel obtained by step b) with UV light of 365 nm wavelength for 20 minutes under an irradiation intensity of 65 mW/cm$^2$; and d) heating the LCD panel obtained by step c) to induce heat polymerization of the heat polymerizable monomer and the expansive monomer in the composition, wherein the reaction temperature of the heat polymerization is 110° C., and the reaction time is 2 hours.

The vernier key level of the resultant LCD panel was observed and reported in Table 1 below.

Example 7

This example provides a sealant composition that comprises, based on the total mass of the composition:

30% of butyl acrylate as a UV polymerizable monomer having carbon-carbon double bond, 18% of glycol diglycidyl ether as a heat polymerizable monomer, 9% of 1,4,6-trioxaspiro[4,4]nonane and 10% of 3,9-di(2-norbornenyl)-1,5,7,11-tetraoxaspiro[5,5]undecane as an expansive monomer, 4% of lauroyl peroxide as a photoinitiator, 19% of 1,8-diamino-3,6-dioxaoctane as a heat curing agent, and 10% of SiO$_2$ particles having a particle size in the range of 0.5-2 μm as a particle additive.

The method of applying the aforesaid sealant composition comprises the following steps:

a) weighing the aforesaid components of the sealant composition in proportion as described above and mixing the same to form a homogeneous mixture, followed by deaerating in a deaerator under dark condition for 4.5 hours;

b) coating the mixture obtained by step a) onto a CF substrate, and then filling liquid crystal between the CF substrate and a TFT substrate followed by alignment and assembly, thereby forming an LCD panel;

c) irradiating the LCD panel obtained by step b) with UV light of 355 nm wavelength for 60 minutes under an irradiation intensity of 0.1 mW/cm$^2$; and d) heating the LCD panel obtained by step c) to induce heat polymerization of the heat polymerizable monomer and the expansive monomer in the composition, wherein the reaction temperature of the heat polymerization is 120° C., and the reaction time is 1 hour.

The vernier key level of the resultant LCD panel was observed and reported in Table 1 below.

Example 8

This example provides a sealant composition that comprises, based on the total mass of the composition:

29% of butyl acrylate as a UV polymerizable monomer having carbon-carbon double bond, 20% of glycol diglycidyl ether as a heat polymerizable monomer, 20% of 3,9-di(2-anthryl)-1,5,7,11-tetraoxaspiro[5,5]undecane as an expansive monomer, 5% of 2,2'-azobisisoheptonitrile as a photoinitiator, 20% of 1,8-diamino-3,6-dioxaoctane as a heat curing agent, and 6% of SiO$_2$ particles having a particle size in the range of 0.5-2 μm as a particle additive.

The method of applying the aforesaid sealant composition comprises the following steps:

a) weighing the aforesaid components of the sealant composition in proportion as described above and mixing the same to form a homogeneous mixture, followed by deaerating in a deaerator under dark condition for 5 hours;

b) coating the mixture obtained by step a) onto a CF substrate, and then filling liquid crystal between the CF substrate and a TFT substrate followed by alignment and assembly, thereby forming an LCD panel;

c) irradiating the LCD panel obtained by step b) with UV light of 380 nm wavelength for 30 minutes under an irradiation intensity of 50 mW/cm$^2$; and d) heating the LCD panel obtained by step c) to induce heat polymerization of the heat polymerizable monomer and the expansive monomer in the composition, wherein the reaction temperature of the heat polymerization is 120° C., and the reaction time is 1 hour.

The vernier key level of the resultant LCD panel was observed and reported in Table 1 below.

Comparative Example

This comparative example provides a sealant composition without an expansive monomer that comprises, based on the total mass of the composition:

36% of methyl acrylate as a UV polymerizable monomer having carbon-carbon double bond, 23% of glycol diglycidyl ether as a heat polymerizable monomer, 1.5% of lauroyl peroxide as a photoinitiator, 25% of 1,8-diamino-3,6-dioxaoctane as a heat curing agent, and 14% of SiO$_2$ particles having a particle size in the range of 0.5-2 μm as a particle additive.

The method of applying the aforesaid sealant composition is the same as that of Example 2.

The vernier key level of the resultant LCD panel was observed and reported in Table 1 below.

TABLE 1

The vernier key levels of the LCD panels sealed by different sealant compositions

| No. | vernier key level |
|---|---|
| Comparative Example | 5.3 |
| Example 1 | 3.5 |
| Example 2 | 37 |
| Example 3 | 3.0 |
| Example 4 | 3.2 |
| Example 5 | 25 |
| Example 6 | 1.8 |
| Example 7 | 14 |
| Example 8 | 1.0 |

Note:
the lower the vernier key level of the LCD panel is, the better the quality of the LCD panel is.

As shown in Table 1, compared with the sealant composition without an expansive monomer, the vernier key level of the LCD panels obtained in Examples 1-8 of the present invention is lower significantly, which states that the sealant comprising an expansive monomer according to the present invention can obviate the volume shrinkage during polymerization of the composition, thereby improve the alignment accuracy, enhance the bonding strength, and reduce the vernier key level of the LCD panels.

It is understood that the present invention is not limited to the above-illustrated embodiments, which were chosen and described in order to best explain the principles of the invention. Those skilled in the art can make various modifications or variations without departing from the spirit and essence of the present invention. It is intended that the scope of the invention be defined by the following claims and their equivalents.

The invention claimed is:

1. A sealant composition, characterized by comprising an expansive monomer capable of expanding in volume during polymerization of the sealant composition,
wherein the sealant composition comprises, based on the total mass of the sealant composition:
5-25% of the expansive monomer;
20-30% of a UV polymerizable monomer having carbon-carbon double bond;
15-20% of an epoxy-based heat polymerizable monomer;
0.1-5% of a photoinitiator;
10-20% of a heat curing agent; and
0-20% of a particle additive.

2. The sealant composition according to claim 1, characterized in that the expansive monomer is a spiro-orthocarbonate expansive monomer, bicyclic orthoester expansive monomer, spiro-orthoester expansive monomer or bicyclic lactone expansive monomer.

3. The sealant composition according to claim 1, characterized in that the expansive monomer is any one of 3,9-dihydroxymethyl-3',9'-diethyl-1,5,7,11-tetraoxaspiro[5,5]undecane, 1,4,6-trioxaspiro[4,4]nonane, 3,9-di(2-norbornenyl)-1,5,7,11-tetraoxaspiro[5,5]undecane, and 3,9-di(2-anthryl)-1,5,7,11-tetraoxaspiro[5,5]undecane.

4. The sealant composition according to claim 1, characterized in that the UV polymerizable monomer having carbon-carbon double bond is an alkyl ester of (meth)acrylic acid, wherein the alkyl has 1-4 carbon atoms, and the alkyl may be optionally substituted by a hydroxy group or a carboxyl group, or may be optionally interrupted by a carbonyl group.

5. The sealant composition according to claim 4, characterized in that the alkyl ester of (meth)acrylic acid is selected from any one of methyl acrylate, methyl methacrylate, ethyl acrylate, propyl acrylate, and butyl acrylate.

6. The sealant composition according to claim 1, characterized in that the heat polymerizable monomer is an epoxy-based heat polymerizable monomer.

7. The sealant composition according to claim 6, characterized in that the epoxy-based heat polymerizable monomer is glycol diglycidyl ether.

8. The sealant composition according to claim 1, characterized in that the heat curing agent is a peroxide or azo-compound.

9. The sealant composition according to claim 8, characterized in that the peroxide is selected from any one of dibenzoyl peroxide, lauroyl peroxide, diisopropyl peroxydicarbonate, and dicyclohexyl peroxydicarbonate, and the azo-compound is selected from 2,2'-azobisisobutyronitrile or 2,2'-azobisisoheptonitrile.

10. The sealant composition according to claim 1, characterized in that the heat curing agent is an amino curing agent.

11. The sealant composition according to claim 10, characterized in that the amino curing agent is 1,8-diamino-3,6-dioxaoctane.

12. The sealant composition according to claim 1, characterized in that the particle additive has a particle size in the range of 0.5 to 2 µm.

13. The sealant composition according to claim 1, characterized in that the particle additive is $SiO_2$ particle.

14. A liquid crystal display panel, characterized in that the panel is sealed with a sealant composition comprising an expansive monomer capable of expanding in volume during the polymerization of the sealant composition,
wherein the sealant composition comprises, based on the total mass of the sealant composition:
5-25% of the expansive monomer;
20-30% of a UV polymerizable monomer having carbon-carbon double bond;
15-20% of an epoxy-based heat polymerizable monomer;
0.1-5% of a photoinitiator;
10-20% of a heat curing agent; and
0-20% of a particle additive.

* * * * *